(12) United States Patent
Zhou et al.

(10) Patent No.: US 11,388,589 B2
(45) Date of Patent: Jul. 12, 2022

(54) WIRELESS COMMUNICATIONS FOR VEHICLE COLLISION RESPONSE

(71) Applicant: AT&T Intellectual Property I, L.P., Atlanta, GA (US)

(72) Inventors: Yu Zhou, Somerset, NJ (US); Rittwik Jana, Montville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 57 days.

(21) Appl. No.: 16/800,251

(22) Filed: Feb. 25, 2020

(65) Prior Publication Data

US 2021/0266732 A1     Aug. 26, 2021

(51) Int. Cl.
*H04W 12/00*     (2021.01)
*H04W 12/033*     (2021.01)
*H04L 9/32*     (2006.01)
*H04L 9/30*     (2006.01)

(52) U.S. Cl.
CPC ......... *H04W 12/033* (2021.01); *H04L 9/3073* (2013.01); *H04L 9/3247* (2013.01); *H04L 9/3263* (2013.01)

(58) Field of Classification Search
CPC .. H04W 12/033; H04L 9/3263; H04L 9/3073; H04L 9/3247
See application file for complete search history.

(56) References Cited

U.S. PATENT DOCUMENTS

| | | | |
|---|---|---|---|
| 2005/0071052 A1* | 3/2005 | Coletrane | G07C 5/008 701/1 |
| 2015/0057838 A1* | 2/2015 | Scholl | G06Q 50/265 701/2 |
| 2020/0294401 A1* | 9/2020 | Kerecsen | G05D 1/0287 |

* cited by examiner

*Primary Examiner* — Jeffrey C Pwu
*Assistant Examiner* — Mayasa A. Shaawat
(74) *Attorney, Agent, or Firm* — Amin, Turocy & Watson, LLP

(57) ABSTRACT

The described technology is generally directed towards wireless communications for vehicle collision response. Devices onboard vehicles can wirelessly exchange information in response to detecting a collision. Public encryption keys can be exchanged, and exchanged information can optionally be encrypted using a received public encryption key. Exchanged information can include vehicle identification information and collision information. The collision information can furthermore be certified using a vehicle's private encryption key.

20 Claims, 10 Drawing Sheets

WIRELESS COMMUNICATIONS FOR VEHICLE COLLISION RESPONSE

TECHNICAL FIELD

The subject application is related to wireless communications by vehicle-based computing devices in response to collisions. The wireless communications can be conducted through a variety of wireless technologies, including fifth generation (5G) and subsequent generation cellular communication systems.

BACKGROUND

New vehicle technologies are a field of considerable interest and commercial development. Electric cars have become commonplace. Autonomous vehicles, such as driverless cars and other vehicles, are an area of active research and development. Furthermore, vehicles are increasingly "smart," through the use of sensors and onboard computers, and connected, whether to mobile phones, to other vehicles, or to cellular communication networks. Because of its increased high speed data capacity, emerging fifth generation (5G) cellular communication systems are expected to enable further dramatic increases in vehicle communications.

Meanwhile, the basic protocol followed by drivers in response to collisions remains antiquated. Drivers pull their cars to the side of the road and they may call the police if necessary. Drivers will also get out of their cars and exchange insurance information in person, and call their respective insurance companies.

The in person exchange of insurance information is particularly problematic. There can be a variety of hassles as can be appreciated. For example, getting out of cars can be dangerous on certain roads. If the accident is a hit and run, it may be impossible to exchange insurance information. A driver may be incapacitated, upset, or intoxicated. Sometimes police time and effort is required to assist in appropriate information exchange.

The above-described background relating to facilitating information exchange is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
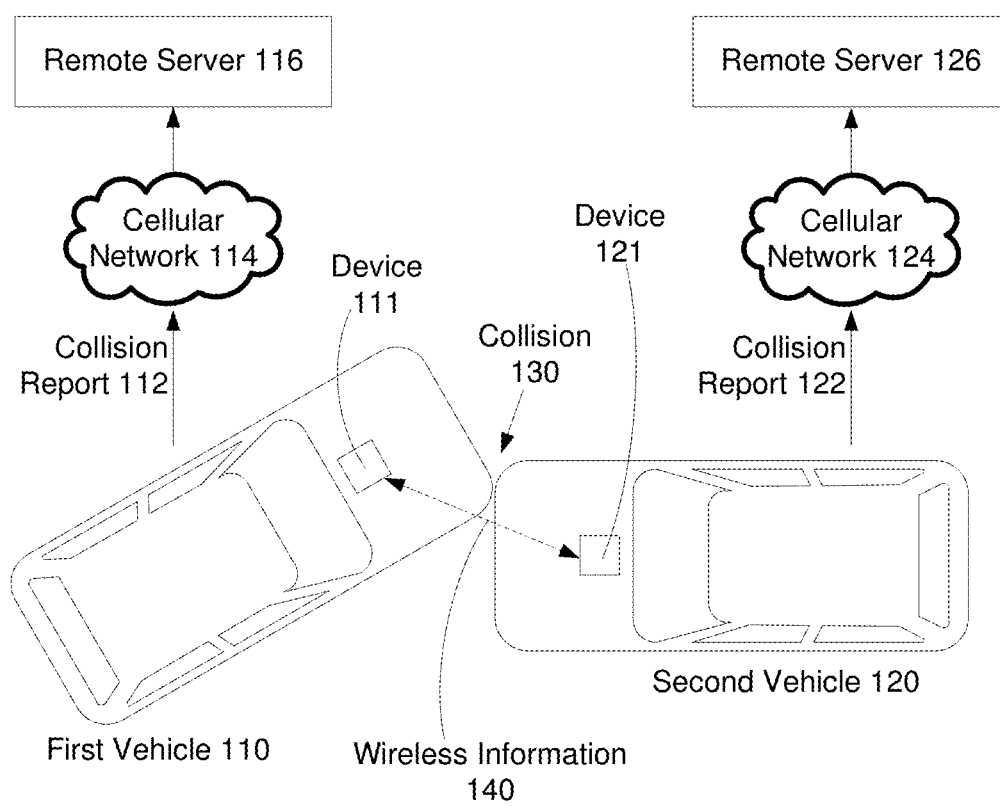
FIG. 1 illustrates an example wireless information exchange in response to a vehicle collision, in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details, and without applying to any particular networked environment or standard.

As noted in the background, it would be desirable to the industry for improved vehicle collision response technologies to improve the speed and accuracy of information exchange. In this regard, one or more aspects of the technology described herein are generally directed towards wireless communications for vehicle collision response. Vehicle based devices can wirelessly exchange information in response to detecting a collision. Public encryption keys can be exchanged, and exchanged information can optionally be encrypted using a received public encryption key. Exchanged information can include vehicle identification information and collision information. The collision information can furthermore be certified using a vehicle's private encryption key.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), fifth generation core (5G Core), fifth generation option 3× (5G Option 3×), high speed packet access (HSPA), Z-Wave, Zigbee and other 802.XX wireless technologies and/or legacy telecommunication technologies.

FIG. 1 illustrates an example wireless information exchange in response to a vehicle collision, in accordance with various aspects and embodiments of the subject disclosure. FIG. 1 includes a first vehicle 110 and a second vehicle 120. The vehicles 110 and 120 have experienced a collision 130. In response to the collision 130, a device 111 in the first vehicle 110 can exchange wireless information 140 with a device 121 in the second vehicle 120. The device 111 in the first vehicle 110 can subsequently send a collision report 112 via a cellular network 114 to a remote server 116. Likewise, the device 121 in the second vehicle 120 can subsequently send a collision report 122 via a cellular network 124 to a remote server 126.

In an embodiment, devices 111 and 121 can be configured to determine that a collision 130 has occurred from various sensor inputs, e.g., accelerometer inputs. In response to the collision 130, the devices 111 and 121 can initially exchange wireless information 140 via a short range wireless technology, for example using Wi-Fi, Bluetooth, or another short range wireless technology. Devices 111 and 121 can subsequently use a long range wireless technology, such as a fifth generation (5G) network or subsequent generation cellular communications technology, to send collision reports 112 and 122. Alternatively, the devices 111 and 121 can use the short range wireless technology for both wireless information 140 and collision reports 112 and 122, for example by using the short range wireless technology to connect to the internet at a next available opportunity subsequent to collision 130.

Figure 2:
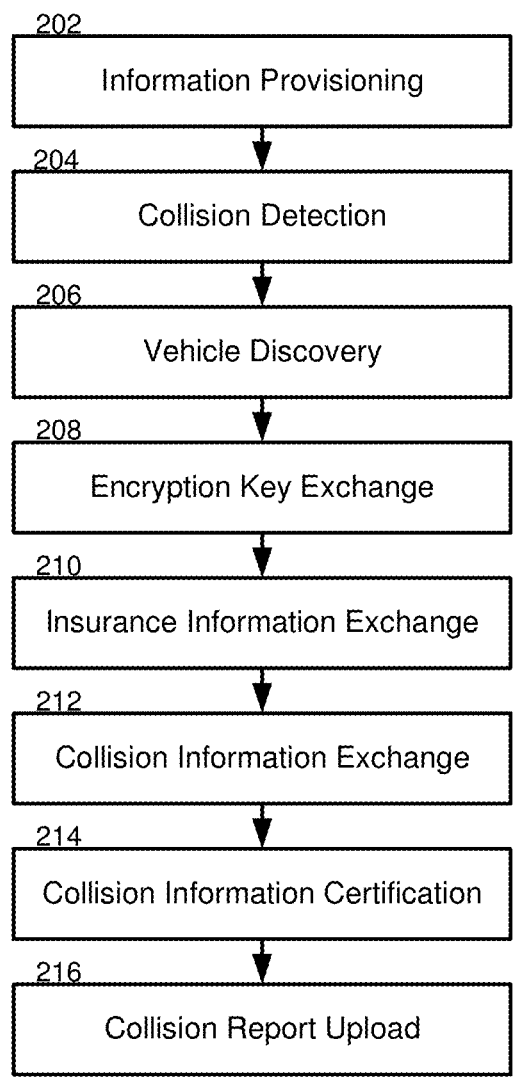
FIG. 2 illustrates example operations performed in connection with wireless information exchange, in accordance with various aspects and embodiments of the subject disclosure.

FIG. 2 illustrates example operations performed in connection with wireless information exchange, in accordance with various aspects and embodiments of the subject disclosure. The operations illustrated in FIG. 2 can represent actions performed in a method, functional components of a computing device, or instructions implemented in a machine-readable storage medium executable by a processor. While the operations are illustrated in an example sequence, the operations can be eliminated, combined, or re-ordered in some embodiments.

The various operations illustrated in FIG. 2 can be performed, e.g., by each of devices 111 and 121. For simplicity of description, the operations of one of the devices 111 will be described. An overview of the illustrated operations will be followed by a more detailed description of certain aspects of the illustrated operations.

In an overview of FIG. 2, at information provisioning 202, device 111 can initially be provisioned with information to be exchanged in the event of a collision, such as a vehicle identifier and optionally other information, referred to in general herein as "insurance information". The provisioned insurance information can include, e.g., a vehicle identifier (of first vehicle 110), and a public/private encryption key pair for use in wireless information exchanges. The provisioned insurance information can be stored by device 111 for use in response to a collision.

At collision detection 204, device 111 can detect a collision 130. At vehicle discovery 206, device 111 can determine if another vehicle involved in the collision 130, such as second vehicle 120, is equipped for wireless information exchange. If so, at encryption key exchange 208, device 111 can exchange public encryption keys with the device 121 at the second vehicle 120, as well as with any further vehicles (not shown) which may have been involved in the collision 130.

At insurance information exchange 210, device 111 can wirelessly exchange insurance information, provisioned at operation 202, with device 121. The exchanged insurance information can include, e.g., the vehicle identifiers (IDs) of first vehicle 110 and the second vehicle 120. The exchanged insurance information can optionally be encrypted using the public encryption key of the other vehicle. For example, device 111 can encrypt insurance information for the first vehicle 110 using the public encryption key received from the device 121, and vice versa.

At collision information exchange 212, device 111 can exchange collision information, such as time and location of the detected collision 130, with the device 121. Collision information recorded at device 111 may differ in some respects from the collision information recorded at device 121. After the collision information exchange 212, each device 111 and 121 can store the other device's version of the collision information. The device 111 can optionally compare the two versions of collision information to determine if they relate to a same collision 130. The collision information can optionally be exchanged "in the clear" (without encryption), or otherwise in encrypted form.

At collision information certification 214, device 111 can certify the collision information sent to device 121. Device 111 can also receive certification information from device 121, which certifies the version of collision information recorded at device 121. There are various potential technical approaches to certify collision information, and an example approach is described herein in detail with reference to FIG. 4.

Finally, at collision report upload 216, device 111 can upload a collision report 112 to the remote server 116. In an embodiment, the remote server 116 can be provided by an insurance company or insurance company intermediary. The collision report 112 can include, e.g., the insurance information exchanged at operation 210, and certified collision information exchanged at operation 212 and certified at operation 214. The collision report 112 can also include additional data, e.g., sensor data, driver data, and passenger data from vehicle 110 which may not necessarily be included in the exchanged collision information.

Turning now to various aspects of FIG. 2 in more detail, at information provisioning 202, a device 111 can receive insurance information to be digitally stored at the first vehicle 110. Example insurance information can include, but is not limited to, insurance policy information such as a policy holder name and policy number for first vehicle 110. Example insurance information can furthermore include vehicle description information such as a vehicle identification number (VIN), any digital vehicle identifier, vehicle make, model, year and/or color information for first vehicle 110. Example insurance information can furthermore include an encryption key pair, e.g., a public encryption key and private encryption key, assigned to the first vehicle 110. Example insurance information can also optionally include address information for electronic communications with the remote server 116.

In a further embodiment, driver information, such as a driver name or other identification information, can be detected at vehicle 110 each time the vehicle 110 is driven. The driver information can be stored by device 111 in addition to the insurance information provisioned at operation 202. Driver detection can be accomplished using a variety of different approaches as can be appreciated, including but not limited to facial recognition, biometric information matching, voice recognition, and the use of unique vehicle access or ignition keys for different drivers.

In a still further embodiment, passengers can be detected at vehicle 110 each time the vehicle 110 is driven. Seat sensors can optionally be used to detect whether a passenger is in a seat, as well as a passenger weight and whether the passenger is wearing a seat belt. Passenger information can be stored by device 111 in addition to the insurance information provisioned at operation 202.

At collision detection 204, in some embodiments, sensors used for airbag deployment can be used for collision detection. In other embodiments, accelerometers or other onboard sensors can be used for collision detection. Sensors can be electronically coupled with device 111, and device 111 can be preconfigured with sensor value thresholds. When the sensor value thresholds are exceeded, the device 111 can determine that a collision 130 is detected. In some embodiments, device 111 can be configured to receive a driver input that indicates a collision 130 has occurred.

In response to collision detection 204, the device 111 can initiate vehicle discovery 206. Vehicle discovery 206 can comprise wirelessly broadcasting information on a predetermined wireless channel, while also activating receive electronics to listen for incoming broadcasts from other vehicles. If another vehicle's broadcast is detected, the device 111 can optionally initiate a communication session, e.g., a one-to-one communication session, with the other vehicle. In an embodiment, vehicle discovery 206 can operate for a predetermined time interval, such as one minute. If communications cannot be established during the time interval, the vehicle discovery operation can be stopped and the device can skip operations 208-214.

At encryption key exchange 208, device 111 can exchange public encryption keys with the device 121 at the second vehicle 120, as well as with any further vehicles (not shown) which may have been involved in the collision 130, and which can also be discovered during vehicle discovery

206. Exchanging public encryption keys with the device 121 can include sending the device's 111 provisioned public key to device 121, and receiving the public key provisioned to vehicle 120 from device 121.

At insurance information exchange 210, device 111 can wirelessly exchange insurance information, provisioned at operation 202, with device 121, as described above. The device 111 can encrypt and send all or any portion of the insurance information, and optionally also the current driver information and/or passenger information, to the device 121.

At collision information exchange 212, device 111 can exchange collision information, such as time and location of the detected collision 130, with the device 121, as described above. Depending on the embodiment, collision information can range from limited to detailed. For example, in a limited embodiment, exchanged collision information can be limited to time and location of the detected collision 130. In a more detailed collision information exchange, collision information can furthermore include information such vehicle heading and speed prior to the collision 130, passenger information, detected road conditions, photos, videos, or audio recordings of the collision 130, and/or sensor values from various onboard sensors. An appropriate scope of collision information can be selected based on legal restrictions and potential privacy concerns. In some embodiments, information which is withheld from collision information can nonetheless be included in a subsequent collision report 112.

In order to compare collision information sent by device 111 with collision information received by device 111, the device 111 may compare, for example, collision times and locations. If the collision time and location in the collision report prepared at vehicle 110 differ from the collision time and location in the collision report prepared at vehicle 120 by less than established threshold values, e.g., the time values are within a minute and the location values are within 50 meters (these threshold values are examples only and other values can be used in other embodiments) then an initial determination can be that the first vehicle 110 and second vehicle 120 have detected a same collision 130. A more detailed analysis of collision information can be conducted if necessary at the remote server 116. Circumstances wherein vehicles are involved in proximal yet independent collisions which nonetheless trigger an unnecessary wireless information exchange can be identified and correctly processed as separate collisions.

Figure 4:
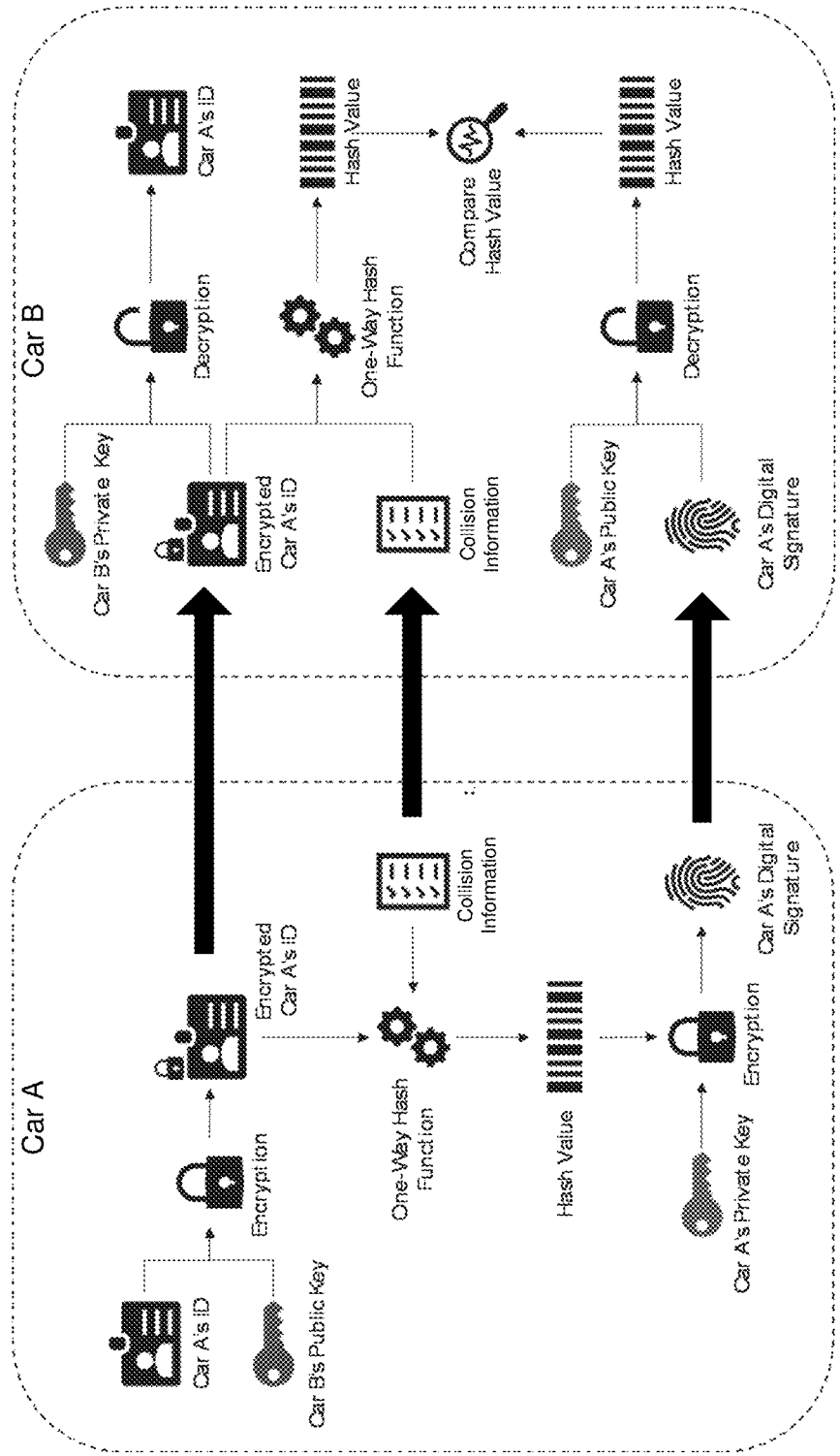
FIG. 4 illustrates example wireless information exchange and collision information certification, in accordance with various aspects and embodiments of the subject disclosure.

As noted above, a variety of approaches can be used for collision information certification 214. In a simplified approach, the device 111 can encrypt collision information exchanged at operation 212 using the private key received at operation 202. The device 121 received the first vehicle 110 public key, per operation 208, and the device 121 can use this public key to decrypt the encrypted collision information received from device 111. Furthermore, only device 111, the holder of the corresponding first vehicle 110 private key, could have encrypted collision information that is decrypt-able using the paired public key for device 111. FIG. 4 provides another, more sophisticated approach for collision information certification 214 which is advantageous for some embodiments.

Figure 3:
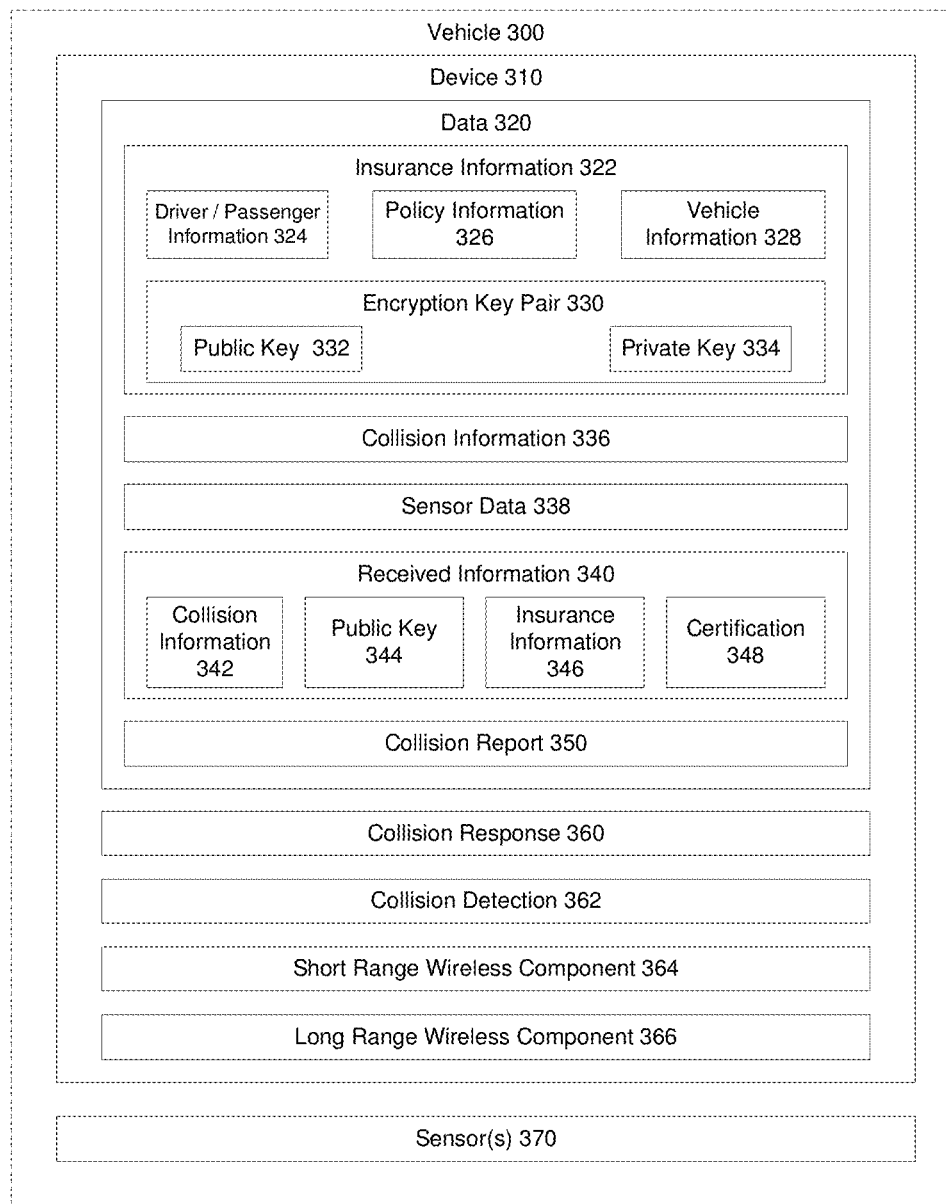
FIG. 3 illustrates an example vehicle based device, in accordance with various aspects and embodiments of the subject disclosure.

FIG. 3 illustrates an example vehicle based device, in accordance with various aspects and embodiments of the subject disclosure. The example device 310 is disposed within a vehicle 300. The vehicle 300 can be, e.g., the first vehicle 110 or the second vehicle 120 illustrated in FIG. 1, and the device 310 provides an example implementation of device 111 or device 121. In addition to device 310, vehicle 300 comprises sensor(s) 370 which can be communicatively coupled with device 310. It will be appreciated that both vehicle 300 and device 310 can comprise many additional features which are not illustrated in FIG. 3.

Device 310 can comprise a variety of data 320, as well as a long range wireless component 366, a short range wireless component 364, a collision detection component 362 and a collision response component 360. The data 320 can comprise insurance information 322, collision information 336, sensor data 338, received information 340, and a collision report 350. The insurance information 322 can include driver/passenger information 324, policy information 326, vehicle information 328, and an encryption key pair 330 comprising a public key 332 and a paired private key 334. The received information 340 can comprise collision information 342, public key 344, insurance information 346, and certification 348.

Figure 5:
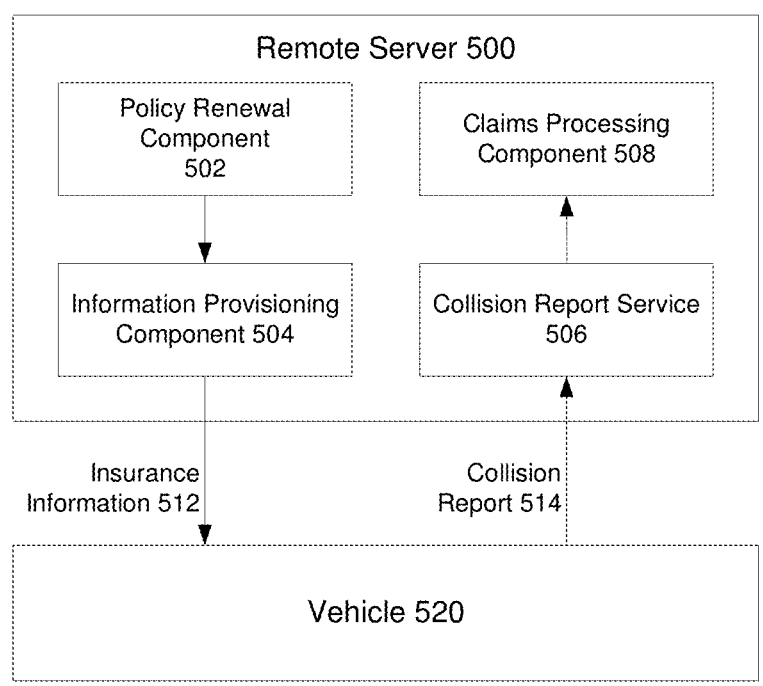
FIG. 5 illustrates an example remote server, in accordance with various aspects and embodiments of the subject disclosure.

In an embodiment, the policy information 326, vehicle information 328, and an encryption key pair 330 can be provided to device 310 by a remote server such as illustrated in FIG. 5, either via long range wireless component 366, such as a 5G cellular radio, or via short range wireless component 364, such as a Wi-Fi radio accessed by device 310 when the vehicle 300 is parked near a home and connected to a home Wi-Fi network. The driver/passenger information 324 can optionally be updated each time the vehicle 300 is powered on, using information gathered from sensor(s) 370.

In a further aspect, sensor(s) 370 can collect and store sensor data 338 as the vehicle 300 is operated. Sensor data 338 can include, for example, vehicle 300 heading and speed history, vehicle 300 location history, accelerometer information, photo and video data from any onboard cameras, and information from any other sensors 370 onboard the vehicle 300.

Collision detection 362 can continuously monitor select sensor data 338 in order to detect a collision. If monitored sensor data 338 indicates a collision, e.g., by exceeding sensor data threshold values, collision detection 362 can activate collision response 360. Collision detection 362 can also initiate storage of collision information 336, such as collision time, collision location, and any desired sensor data 338 pertaining to the detected collision.

Collision response 360 can be configured to perform operations 206-216 illustrated in FIG. 2. In an embodiment, collision response 360 can use short range wireless component 364 to engage in vehicle discovery 206, encryption key exchange 208, insurance information exchange 210, collision information exchange 212, and collision information certification 214. Collision response 360 can use short range wireless component 364 or long range wireless component 366 to perform collision report upload 216.

Upon a successful encryption key exchange 208 by collision response 360, a received public key 344 can be stored in received information 340. The public key 344 can then be used to encrypt at least some of insurance information 322, and the encrypted insurance information 322 can be wirelessly sent to the other vehicle. Conversely, collision response 360 can receive insurance information 346, which can be received in an encrypted format according to public key 332. Collision response 360 can use private key 334 to decrypt the received insurance information 346.

Collision response 360 can be configured to conduct collision information exchange 212 for example by sending collision information 336 to the other vehicle, and receiving collision information 342 from the other vehicle. In a further aspect, collision response 360 can be configured to generate and send a certification to certify collision information 336, e.g., as described in connection with FIG. 4, and collision response 360 can receive and store a certification 348 of collision information 342.

After communications with the other vehicle are completed, collision response 360 can be configured to generate the collision report 350 and upload the collision report 350 to a remote server. The collision report 350 can include any of data 320, including the insurance information 322 and the insurance information 346, the collision information 336 and the collision information 342, the certification 348 and any certification of collision information 336, and any additional sensor data 338 as may be appropriate.

FIG. 4 illustrates example wireless information exchange and collision information certification, in accordance with various aspects and embodiments of the subject disclosure. FIG. 4 illustrates a Car A and a Car B. The illustrated operations provide Car A's information, including Car A's insurance information, Car A's collision information, and Car A's certification of the collision information, to Car B. It will be appreciated that the illustrated operations can also be performed in reverse, in order to provide Car B's information to Car A. In FIG. 4, the terms "first vehicle" and "second vehicle" can refer to either Car A or Car B—the terms "first vehicle" and "second vehicle" as used herein do not imply any particular role in the wireless information exchange, unless otherwise stated for the purpose of a particular example.

In general, with regard to FIG. 4, the illustrated operations can commence after Car A and Car B have experienced a collision, conducted vehicle discovery, and exchanged public keys. Car A can encrypt Car A's ID (for example, vehicle information 328 illustrated in FIG. 3) using Car B's public key. Car A can then send encrypted Car A's ID to Car B. Car B can use Car B's private key to decrypt the received encrypted Car A's ID.

Car A can also send collision information to Car B. In order to certify the collision information, Car A can process the encrypted Car A's ID and the collision information with a one-way hash function, thereby generating a hash value. The hash value can then be encrypted using Car A's private key, and the encrypted hash value is referred to in FIG. 4 as Car A's digital signature. Car A's digital signature constitutes a certification of the collision information by Car A. Car A can send Car A's digital signature to Car B. Car B can verify Car A's digital signature by processing the encrypted Car A's ID and the collision information with a same one-way hash function as applied at Car A, thereby generating the same hash value as generated at Car A. Car B can then use Car A's public key to decrypt Car A's digital signature, thereby yielding what should be the same hash value as generated at Car B using the one-way hash function. Car B can verify that the hash values match. If so, the received collision information is correctly certified by Car A.

In another embodiment according to FIG. 4, it is contemplated that Car A and Car B can be embedded with GPS as well as various sensors. The sensors can, for example, monitor car geolocation, moving speed and direction, sense the direction from which the car gets hit during a collision, and sense the pressure that the car get hits during the collision. Car A and Car B can be pre-installed with encrypted digital IDs (ID_Car) which can be issued by the car insurance company, and can include basic driver information, car VIN, and car insurance information. In an embodiment, a digital ID can only be decrypted by the car insurance company. Each car can be pre-installed with a key pair comprising a unique public key (PublicKey_Car) and a unique private key (PrivateKey_Car) which can be used for data transmission during and after the collision.

Once a collision happens between Car A and Car B, Car A and Car B can exchange their public keys PublicKey_CarA and PublicKey_CarB in a 5G network which can make use of, e.g., vehicle to vehicle (V2V), Vehicle-to-Infrastructure (V2I) or Vehicle-to-Network (V2N) communication protocols. Car A and Car B can exchange their digital IDs, collision information, and corresponding digital signatures over a 5G network. Car A can transmit to Car B its digital ID (ID_CarA) which can be encrypted using previously received car B's public key (PublicKey_CarB). Car A can furthermore transmit to Car B a corresponding digital signature based on (ID_CarA, accident location, accident timestamp) which can be encrypted using car A's private key (PrivateKey_CarA).

Conversely, Car B can transmit to Car A its digital ID (ID_CarB) which can be encrypted using previously received car A's public key (PublicKey_CarA). Car B can transmit to Car A a corresponding digital signature based on (ID_CarB, accident location, accident timestamp) which can be encrypted using car B's private key (PrivateKey_CarB).

Car A and Car B can decrypt their respective received digital IDs. Car A decrypts the received digital ID of Car B (ID_CarB) using its private key (PrivateKey_CarA), and validates the received digital signature using Car B's public key (PublicKey_CarB). Car B decrypts the received digital ID of Car A (ID_CarA) using its private key (PrivateKey_CarB), and validates the received digital signature using Car A's public key (PublicKey_CarA).

While other cars nearby may receive the encrypted messages, they don't have the correct private keys, so the messages cannot be decrypted. Each car involved in the accident can upload, to a remote server provided by its respective insurance company, its digital ID and the received digital ID of the other car, as well as sensor measurements during the car accident. The upload can be conducted automatically in the real-time, or manually (i.e., responsive to an operator command) afterwards. Car insurance companies can make compensation decisions for the cars involved in the collision with the assistance from collision information and/or sensor measurements from each vehicle.

FIG. 5 illustrates an example remote server, in accordance with various aspects and embodiments of the subject disclosure. The example remote server 500 can communicate with a vehicles such as example vehicle 520. The remote server 500 illustrates an example implementation of remote servers 116 and 126, illustrated in FIG. 1. The vehicle 520 can be any of the various vehicles illustrated herein, e.g., first vehicle 110 or second vehicle 120.

In FIG. 5, the example remote server 500 comprises a policy renewal component 502, an information provisioning component 504, a collision report service 506, and a claims processing component 508. In an example according to FIG. 5, the policy renewal component 502 can provide policy information to information provisioning component 504. The information provisioning component 504 can generate the insurance information to be supplied to the vehicle 520. The insurance information can comprise, e.g., the encryption key pair 330, the policy information 326 and/or the vehicle information 328 illustrated in FIG. 3. The information provisioning component 504 can send the generated insurance information 512 to the vehicle 520.

The vehicle 520 can generate and send a collision report 514 to the remote server 500 after a collision of the vehicle 520. The collision report 514 can include aspects of collision reports described herein, including, e.g., collision information and vehicle identifications of the vehicles involved. The remote server 500 can include a collision report service 506 for the purpose of receiving collision reports 514. In some embodiments, the collision report service 506 can comprise a network application programming interface (API) configured to receive collision report data. The network address of the collision report service 506 can optionally be included in insurance information 512.

The collision report service 506 can provide the collision report 514 to the claims processing component 508 for processing. Claims processing component 508 can apply any desired policies or processing approaches to efficiently classify and resolve claims triggered by the collision report 514.

Figure 6:
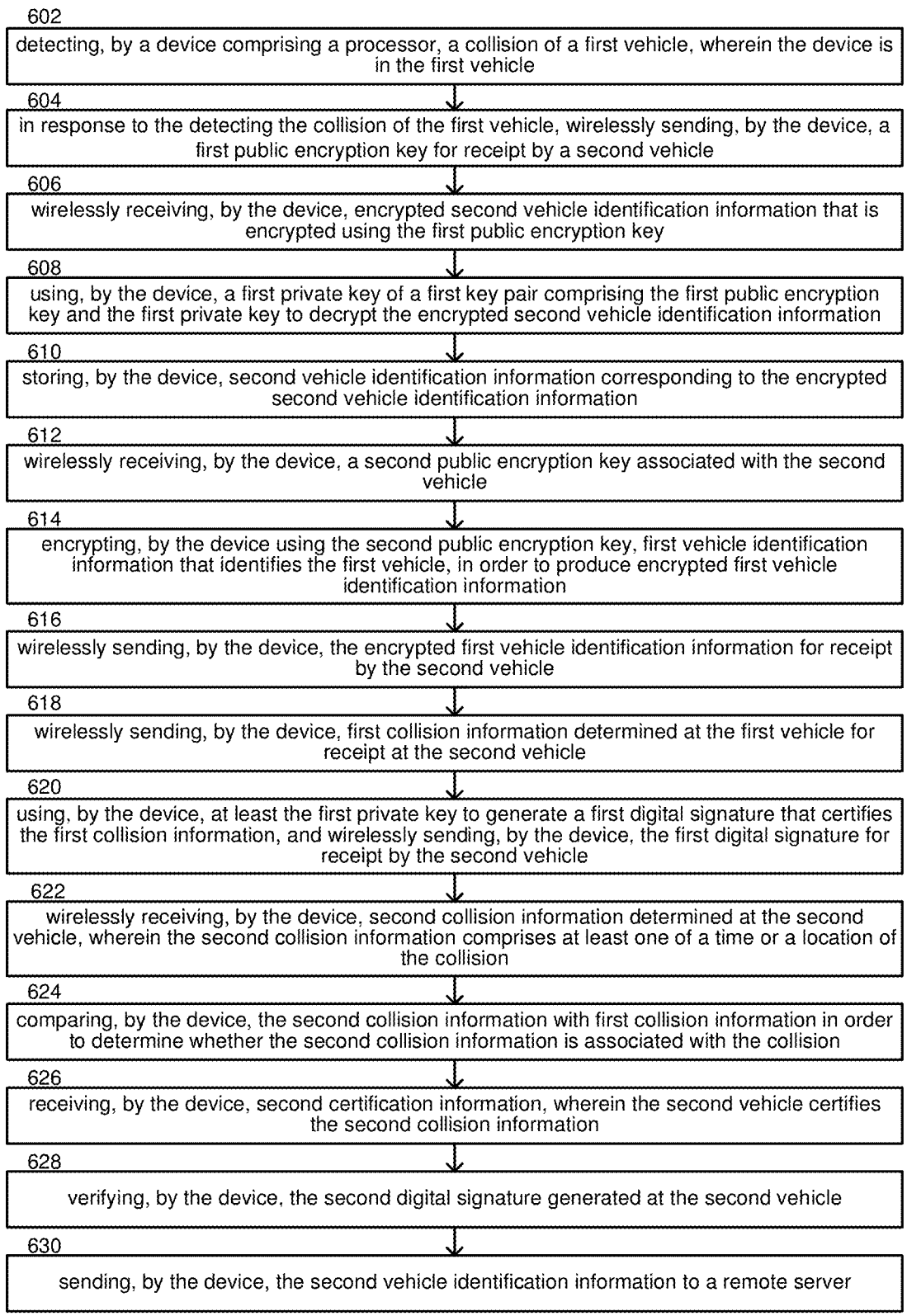
FIG. 6 is a flow diagram representing example operations of a device in a first vehicle, in accordance with various aspects and embodiments of the subject disclosure.

FIG. 6 is a flow diagram representing example operations of a device in a first vehicle, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 6 can be performed, for example, by device 111 in first vehicle 110, as illustrated in FIG. 1. Example operations comprise operation 602, which represents detecting, by a device 111 comprising a processor, a collision 130 of a first vehicle 110, wherein the device 111 is in the first vehicle 110.

Operations 604-610 allow the device 111 to receive vehicle identification information from the second vehicle 120. Operation 604 represents, in response to the detecting the collision 130 of the first vehicle 110, wirelessly sending, by the device 111, a first public encryption key for receipt by a second vehicle 120. Operation 606 represents wirelessly receiving, by the device 111, encrypted second vehicle identification information that is encrypted using the first public encryption key. Operation 608 represents using, by the device 111, a first private key of a first key pair comprising the first public encryption key and the first private key to decrypt the encrypted second vehicle identification information. Operation 610 represents storing, by the device 111, second vehicle identification information corresponding to the encrypted second vehicle identification information.

Operations 612-616 allow the device 111 to provide vehicle identification information to the second vehicle 120. Operation 612 represents wirelessly receiving, by the device 111, a second public encryption key associated with the second vehicle 120. Operation 614 represents encrypting, by the device 111, using the second public encryption key, first vehicle identification information that identifies the first vehicle 110, in order to produce encrypted first vehicle identification information. Operation 616 represents wirelessly sending, by the device 111, the encrypted first vehicle identification information for receipt by the second vehicle 120.

Operations 618-620 allow the device 111 to provide certified collision information to the second vehicle 120. Operation 618 represents wirelessly sending, by the device 111, first collision information determined at the first vehicle 110 for receipt at the second vehicle 120. Operation 620 represents using, by the device 111, at least the first private key to generate a first digital signature that certifies the first collision information, and wirelessly sending, by the device 111, the first digital signature for receipt by the second vehicle 120.

Operations 622-628 allow the device 111 to receive and verify certified collision information from the second vehicle 120. Operation 622 represents wirelessly receiving, by the device 111, second collision information determined at the second vehicle 120, wherein the second collision information comprises at least a collision time and a collision location associated with the collision 130. Operation 624 represents comparing, by the device 111, the second collision information with first collision information in order to determine whether the second collision information is associated with the collision 130. Operation 626 represents wirelessly receiving, by the device 111, second certification information, wherein the second vehicle 120 certifies the second collision information. The second certification information can comprise, for example, a second digital signature generated at the second vehicle 120 using at least one of the second collision information, the encrypted second vehicle identification information, and a second private encryption key associated with the second vehicle. Operation 628 represents verifying, by the device 111, the second digital signature generated at the second vehicle 120.

Having exchanged collision information with the second vehicle 120, the device 111 can proceed to operation 630. Operation 630 represents sending, by the device 111, the second vehicle identification information to a remote server 116. For example, the second vehicle identification information can be included in the collision report 112.

Figure 7:
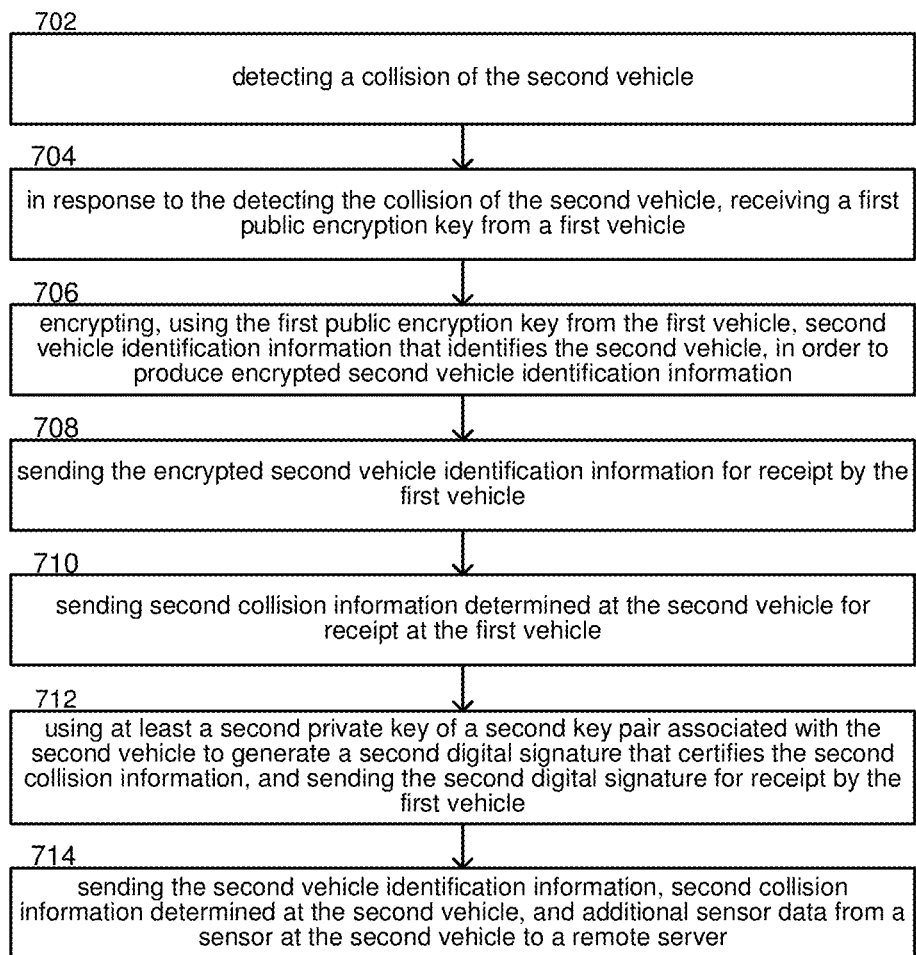
FIG. 7 is a flow diagram representing example operations of a device in a second vehicle, in accordance with various aspects and embodiments of the subject disclosure.

FIG. 7 is a flow diagram representing example operations of a device in a second vehicle, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 7 can be performed, for example, by device 121 in second vehicle 20, as illustrated in FIG. 1. In general, the device 121 can perform a method that is a mirror image of the method carried out by device 111 according to FIG. 6. FIG. 7 illustrates various representative operations of device 121, wherein further operations of device 121 will be understood from FIG. 6 as well as other aspects of this disclosure. Example operations comprise operation 702, which represents detecting a collision 130 of the second vehicle 120.

Operations 704-708 allow the device 121 to receive vehicle identification information from the first vehicle 110. Operation 704 represents, in response to the detecting the collision 130 of the second vehicle 120, receiving a first public encryption key from a first vehicle 110. Operation 706 represents encrypting, using the first public encryption key from the first vehicle 110, second vehicle identification information that identifies the second vehicle 120, in order to produce encrypted second vehicle identification information. The second vehicle identification information is an example of insurance information, e.g., insurance information 322, and as such, second vehicle identification information can be accompanied by other insurance information described herein, e.g., driver information that identifies a driver of the second vehicle 120. Operation 708 represents sending the encrypted second vehicle identification information for receipt by the first vehicle 110.

Operations 710-712 allow the device 121 to provide certified collision information to the first vehicle 110. Operation 710 represents sending second collision information determined at the second vehicle 120 for receipt at the first vehicle 110. Operation 712 represents using at least a second private key of a second key pair associated with the second vehicle to generate a second digital signature that certifies the second collision information, and sending the second digital signature for receipt by the first vehicle 110. As described in connection with FIG. 4, the using at least the second private key of the second key pair associated with the second vehicle 120 to generate the second digital signature that certifies the second collision information can comprise using the second private key and a hash value derived from at least one of the second collision information or the encrypted second vehicle identification information to generate the second digital signature.

Operation 710 represents sending the second vehicle identification information, second collision information determined at the second vehicle 120, and additional sensor data from a sensor at the second vehicle 120 to a remote server 126. For example, the second vehicle identification information, second collision information determined at the second vehicle 120, and additional sensor data from a sensor at the second vehicle 120 can be included in collision report 122.

Figure 8:
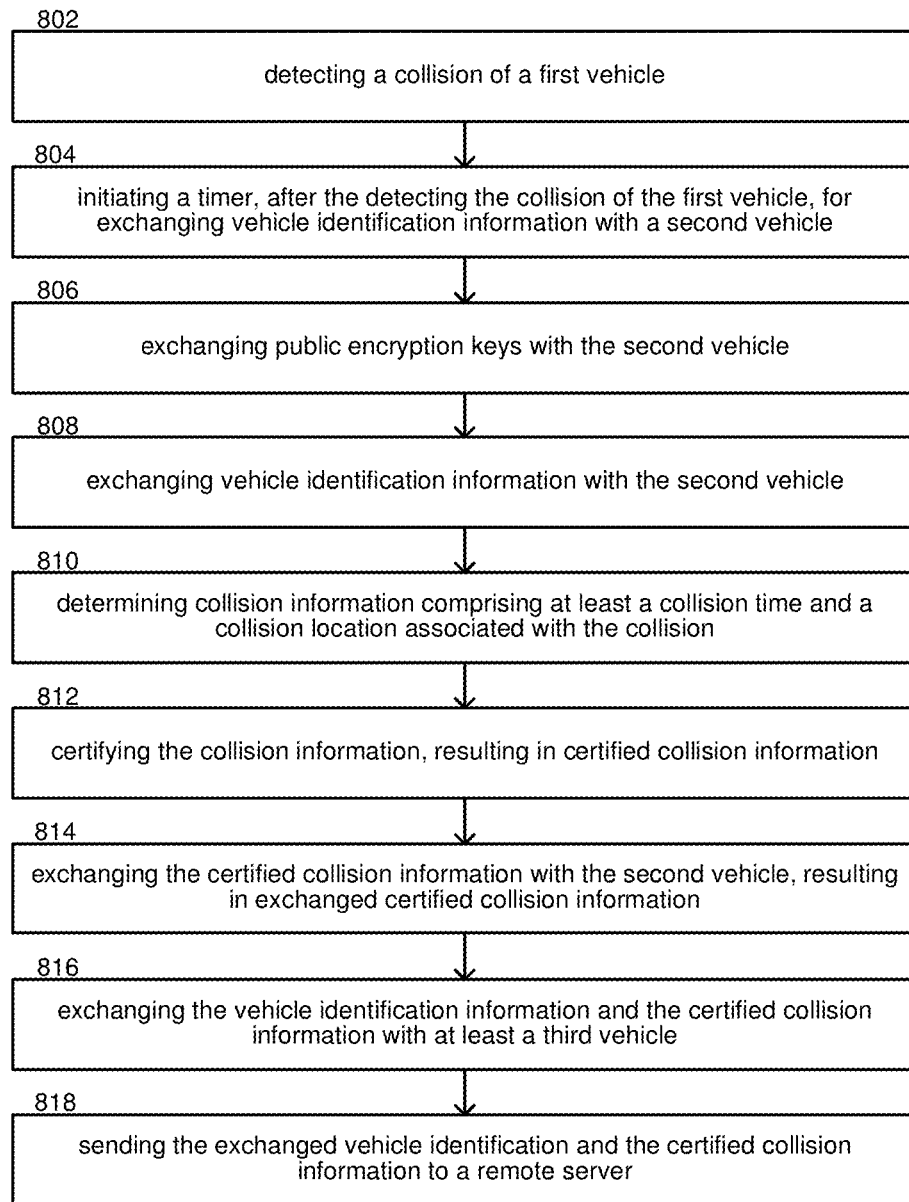
FIG. 8 is a flow diagram representing another set of example operations of a device in a first vehicle, in accordance with various aspects and embodiments of the subject disclosure.

FIG. 8 is a flow diagram representing another set of example operations of a device in a first vehicle, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

Similar to FIG. 6, the operations illustrated in FIG. 8 can be performed, for example, by device 111 in first vehicle 110, as illustrated in FIG. 1. It will be appreciated that persons of skill in the art can configure many communication sequence variations according to this disclosure, and FIG. 8 represents one example variation.

Example operations comprise operation 802, which represents detecting a collision 130 of a first vehicle 110. Operation 804 represents initiating a timer, after the detecting the collision 130 of the first vehicle 110, for exchanging vehicle identification information with a second vehicle 120. If the timer expires without exchanging vehicle identification, then the information exchange can be discontinued. Otherwise, embodiments can continue with the remaining operations illustrated in FIG. 8.

Operation 806 represents exchanging public encryption keys with the second vehicle 120. The exchange of public encryption keys can be optional in some embodiments. In other embodiments, received public encryption keys can be used to encrypt any portion of the various exchanged wireless information 140 described herein.

Operation 808 represents exchanging vehicle identification information with a second vehicle 120. The vehicle identification information can optionally be accompanied by other insurance information as described herein.

Operations 810-814 relate to exchanging certified collision information. Operation 810 represents determining collision information comprising at least a collision time and a collision location associated with the collision 130. Operation 812 represents certifying the collision information, resulting in certified collision information. Operation 814 represents exchanging the certified collision information with the second vehicle 120, resulting in exchanged certified collision information.

Operation 816 represents exchanging the vehicle identification information and the certified collision information with at least a third vehicle. The third vehicle is not illustrated in FIG. 1, however, a third vehicle can comprise another instance of the second vehicle 120. In general, any of the various operations described herein can be performed as many times as needed to exchange information with any vehicles discovered by device 111 after collision 130. This disclosure is not limited to two-vehicle collisions. On the contrary, more vehicles involved in collision 130 can improve the ability to reconstruct the collision 130 and make determinations regarding claim settlement. Operation 818 represents sending the exchanged vehicle identification and the certified collision information to a remote server 116.

Figure 9:
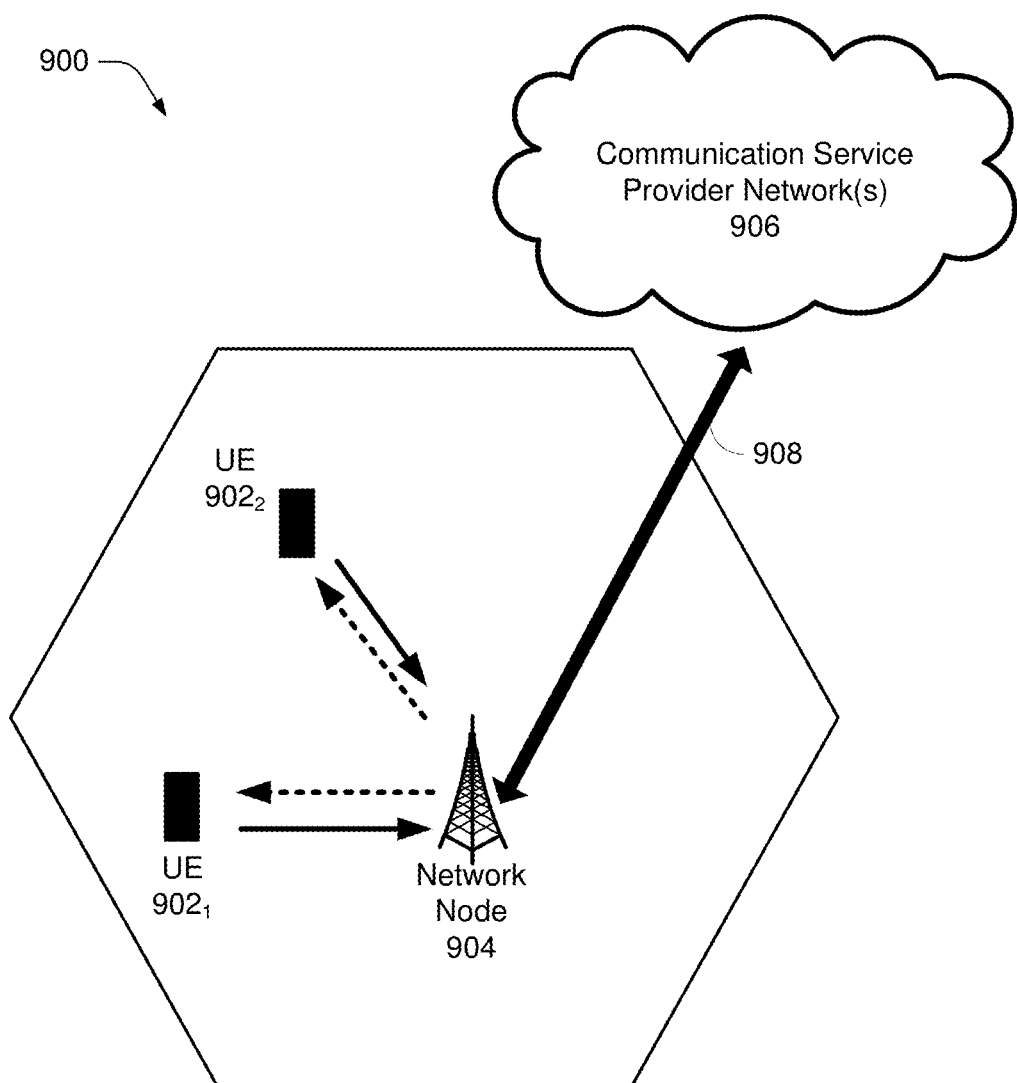
FIG. 9 illustrates an example wireless communication system, in accordance with various aspects and embodiments of the subject disclosure.

FIG. 9 illustrates a non-limiting example of a wireless communication system 900 in accordance with various aspects and embodiments of the subject disclosure. The wireless communication system 900 can be used in connection with any of the wireless communications described herein. In one or more embodiments, system 900 can comprise one or more user equipment UEs $902_1$, $902_2$, referred to collectively as UEs 902, a network node 904, and communication service provider network(s) 906. The UEs $902_1$, $902_2$ can comprise vehicle based devices such as device 111 or device 121, or vehicle based devices 111, 121 can connect with UEs $902_1$, $902_2$ in order to access wireless communication system 900.

The non-limiting term "user equipment" can refer to any type of device that can communicate with a network node 904 in a cellular or mobile communication system 900. UEs 902 can have one or more antenna panels having vertical and horizontal elements. Examples of UEs 902 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, and the like. UEs 902 can also comprise IOT devices that communicate wirelessly.

In various embodiments, system 900 comprises communication service provider network(s) 906 serviced by one or more wireless communication network providers. Communication service provider network(s) 906 can include a "core network". In example embodiments, UEs 902 can be communicatively coupled to the communication service provider network(s) 906 via network node 904. The network node 904 (e.g., network node device) can communicate with UEs 902, thus providing connectivity between the UEs 902 and the wider cellular network. The UEs 902 can send transmission type recommendation data to the network node 904. The transmission type recommendation data can comprise a recommendation to transmit data via a closed loop MIMO mode and/or a rank-1 precoder mode.

A network node 904 can have a cabinet and other protected enclosures, computing devices, an antenna mast, and multiple antennas for performing various transmission operations (e.g., MIMO operations). Network node 904 can comprise one or more base station devices which implement features of the network node 904. Network nodes can serve several cells, also called sectors, depending on the configuration and type of antenna. In example embodiments, UEs 902 can send and/or receive communication data via a wireless link to the network node 904. The dashed arrow lines from the network node 904 to the UEs 902 represent downlink (DL) communications and the solid arrow lines from the UEs 902 to the network node 904 represents an uplink (UL) communications.

Communication service provider networks 906 can facilitate providing wireless communication services to UEs 902 via the network node 904 and/or various additional network devices (not shown) included in the one or more communication service provider networks 906. The one or more communication service provider networks 906 can include various types of disparate networks, including but not limited to: cellular networks, femto networks, picocell networks, microcell networks, internet protocol (IP) networks Wi-Fi service networks, broadband service network, enterprise networks, cloud based networks, millimeter wave networks and the like. For example, in at least one implementation, system 900 can be or include a large scale wireless communication network that spans various geographic areas. According to this implementation, the one or more communication service provider networks 906 can be or include the wireless communication network and/or various additional devices and components of the wireless communication network (e.g., additional network devices and cell, additional UEs, network server devices, etc.).

The network node 904 can be connected to the one or more communication service provider networks 906 via one or more backhaul links 908. For example, the one or more backhaul links 908 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 908 can also include wireless link components, such as but not limited to, line-of-sight (LOS) or non-LOS links which can include terrestrial air-interfaces or deep space links (e.g., satellite communication links for navigation). In an embodiment, network node 904 can be part of an integrated access and backhaul network. This may allow easier deployment of a dense network of self-backhauled 5G cells in a more integrated manner by building upon many of the control and data channels/procedures defined for providing access to UEs.

Wireless communication system 900 can employ various cellular systems, technologies, and modulation modes to facilitate wireless radio communications between devices (e.g., the UE 902 and the network node 904). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 900 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 900 are particularly described wherein the devices (e.g., the UEs 902 and the network device 904) of system 900 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 900 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are planned for use in 5G systems.

Figure 10:
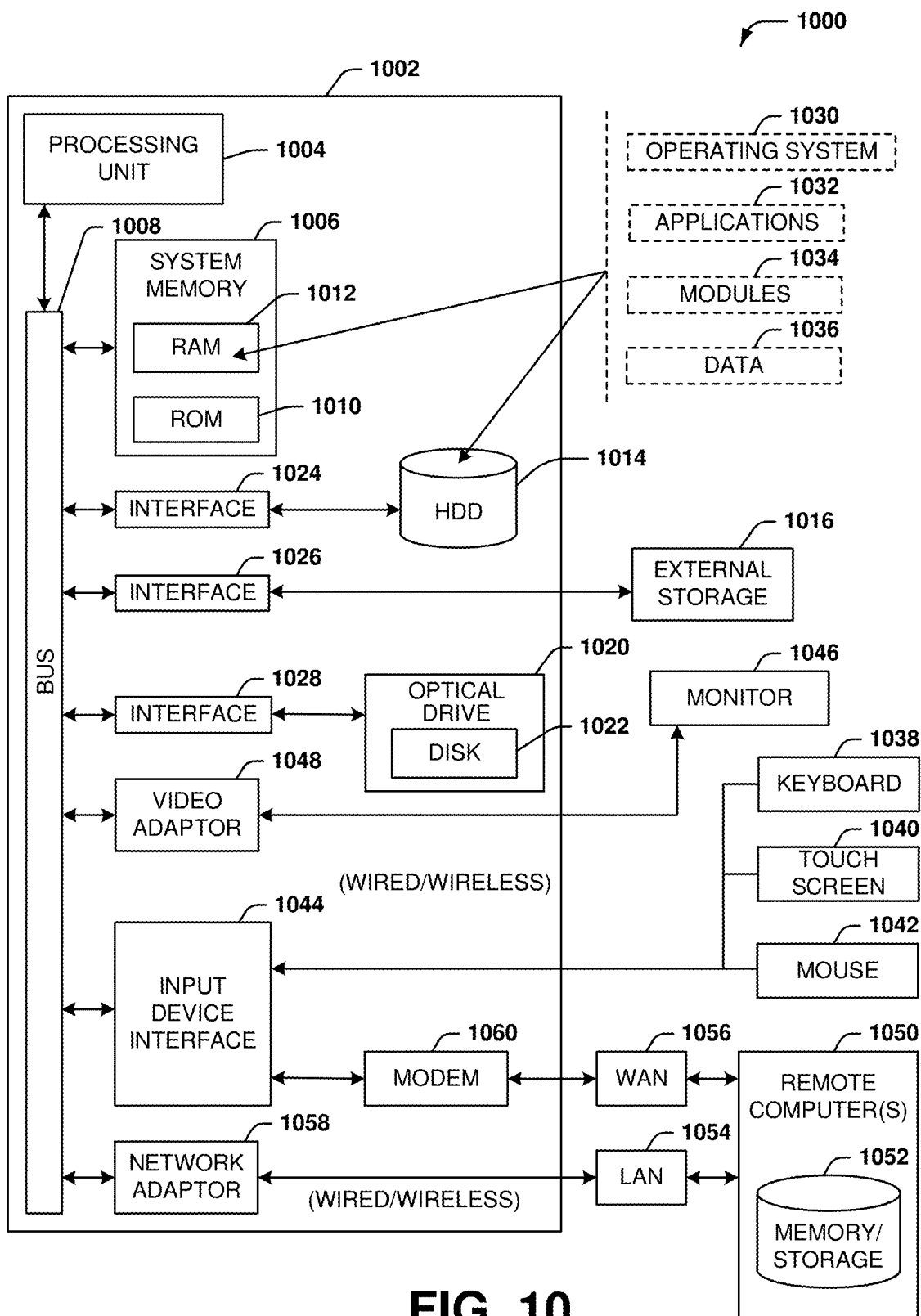
FIG. 10 is a block diagram of an example computer that can be operable to execute processes and methods in accordance with various aspects and embodiments of the subject disclosure.

FIG. 10 is a block diagram of an example computer that can be operable to execute processes and methods in accordance with various aspects and embodiments of the subject disclosure. The example computer can be adapted to implement, for example, a device 111 or 121, or a remote server 116 or 126, as described herein.

FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    detecting, by a device comprising a processor, a collision of a first vehicle, wherein the device is in the first vehicle;
    in response to the detecting the collision of the first vehicle, wirelessly sending, by the device, a first public encryption key for receipt by a second vehicle;
    wirelessly receiving, by the device, encrypted second vehicle identification information that is encrypted using the first public encryption key;
    using, by the device, a first private key of a first key pair comprising the first public encryption key and the first private key to decrypt the encrypted second vehicle identification information;
    storing, by the device, second vehicle identification information corresponding to the encrypted second vehicle identification information;
    sending, by the device, first collision information associated with the collision for receipt at the second vehicle;
    generating, by the device, a first digital signature that certifies the first collision information, wherein generating the first digital signature comprises:
        applying a hash function to at least the first collision information, resulting in a hash value, and encrypting the hash value using the first private key, resulting in the first digital signature; and sending, by the device, the first digital signature for receipt at the second vehicle.

2. The method of claim 1, further comprising:

wirelessly receiving, by the device, a second public encryption key associated with the second vehicle;

encrypting, by the device using the second public encryption key, first vehicle identification information that identifies the first vehicle, in order to produce encrypted first vehicle identification information; and wirelessly sending, by the device, the encrypted first vehicle identification information for receipt by the second vehicle.

3. The method of claim 1, further comprising wirelessly receiving, by the device, second collision information determined at the second vehicle, wherein the second collision information comprises at least a collision time and a collision location associated with the collision.

4. The method of claim 3, further comprising wirelessly receiving, by the device, second certification information, wherein the second vehicle certifies the second collision information.

5. The method of claim 4, wherein the second certification information comprises a second digital signature generated at the second vehicle using at least one of the second collision information, the encrypted second vehicle identification information, and a second private encryption key associated with the second vehicle.

6. The method of claim 5, further comprising verifying, by the device, the second digital signature generated at the second vehicle.

7. The method of claim 1, wherein applying the hash function to at least the first collision information comprises applying the hash function to the first collision information and encrypted first vehicle identification information, resulting in the hash value.

8. The method of claim 7, wherein the hash function is a one-way hash function.

9. The method of claim 1, further comprising sending, by the device, the second vehicle identification information to a remote server.

10. The method of claim 1, further comprising wirelessly receiving, by the device, second collision information determined at the second vehicle and comparing, by the device, the second collision information with the first collision information in order to determine whether the second collision information is associated with the collision.

11. A device for deployment in a second vehicle, the device comprising:

a processor; and a memory that stores executable instructions that, when executed by the processor, facilitate performance of operations, comprising:

detecting a collision of the second vehicle;

receiving a first public encryption key from a first vehicle involved in the collision, wherein the first public encryption key is part of a first key pair comprising the first public encryption key and a first private key;

encrypting, using the first public encryption key from the first vehicle, second vehicle identification information that identifies the second vehicle, in order to produce encrypted second vehicle identification information;

sending the encrypted second vehicle identification information for receipt by the first vehicle;

receiving, from the first vehicle, first collision information associated with the collision; and receiving, from the first vehicle, a first digital signature that certifies the first collision information, wherein the first digital signature comprises a hash value generated at the first vehicle by applying a hash function to at least the first collision information, and wherein the first digital signature is encrypted using the first private key.

12. The device of claim 11, wherein the second vehicle identification information identifies a driver of the second vehicle.

13. The device of claim 11, wherein the operations further comprise sending second collision information determined at the second vehicle for receipt at the first vehicle.

14. The device of claim 11, wherein the operations further comprise using at least a second private key of a second key pair associated with the second vehicle to generate a second digital signature that certifies the second collision information, and sending the second digital signature for receipt by the first vehicle.

15. The device of claim 14, wherein using at least the second private key of the second key pair associated with the second vehicle to generate the second digital signature that certifies the second collision information comprises using the second private key and a hash value derived from the second collision information and the encrypted second vehicle identification information to generate the second digital signature.

16. The device of claim 11, wherein the operations further comprise sending the second vehicle identification information, second collision information determined at the second vehicle, and additional sensor data from a sensor at the second vehicle to a remote server.

17. A machine-readable storage medium, comprising executable instructions that, when executed by a processor of a device deployable within a first vehicle, facilitate performance of operations, comprising:

detecting a collision of the first vehicle;

exchanging vehicle identification information with a second vehicle;

determining collision information comprising at least a collision time and a collision location associated with the collision;

certifying the collision information, resulting in certified collision information, wherein the certified collision information comprises a digital signature generated by applying a hash function to the collision information, resulting in a hash value, and encrypting the hash value using a first private key of a first key pair comprising the first private key and a first public encryption key;

exchanging the certified collision information with the second vehicle; and sending the vehicle identification information and the certified collision information to a remote server.

18. The machine-readable storage medium of claim 17, wherein the exchanging the vehicle identification information with the second vehicle comprises exchanging public encryption keys with the second vehicle.

19. The machine-readable storage medium of claim 17, wherein the operations further comprise exchanging the vehicle identification information and the certified collision information with at least a third vehicle.

20. The machine-readable storage medium of claim 17, wherein the operations further comprise initiating a timer, after the detecting the collision of the first vehicle, for the exchanging the vehicle identification information with the second vehicle.

\* \* \* \* \*